March 8, 1949.  N. E. TEMPLE, JR  2,463,655
NONSLIP TRIPOD
Filed Sept. 6, 1945
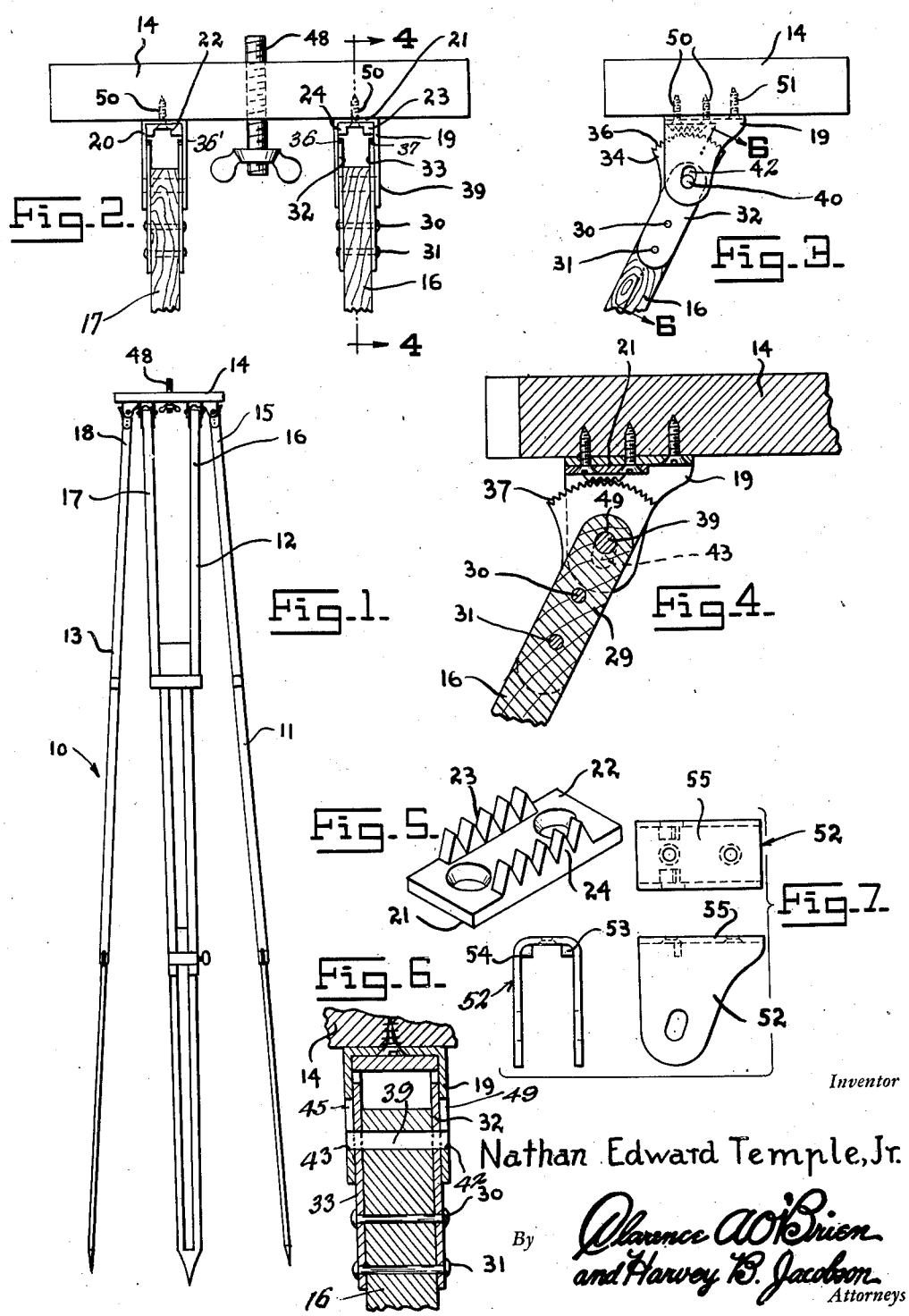
Inventor
Nathan Edward Temple, Jr.
By Clarence A. O'Brien
and Harvey B. Jacobson
Attorneys Patented Mar. 8, 1949

2,463,655

UNITED STATES PATENT OFFICE 2,463,655

NONSLIP TRIPOD

Nathan Edward Temple, Jr., Coatesville, Pa.

Application September 6, 1945, Serial No. 614,646

2 Claims. (Cl. 248—168)

This invention relates to improvements in tripods and has for its object to provide a tripod in which the table and legs thereof may be held in relatively fixed position.

Another object of my invention is to provide a tripod for cameras, transit theodolites, or other valuable instruments which when set up the legs or table of which cannot relatively move.

A further object of the invention is to provide a tripod the legs and table of which become automatically rigidly connected.

A still further object of the invention is to provide a tripod in which the table and legs thereof are rigidly connected when set up automatically become relatively loosened.

Other features and advantages will become more readily apparent from the following description and the accompanying illustrative drawings in which:

Figure 1 is an elevational view of my improved tripod,

Figure 2 is an enlarged elevational view of a tripod table and the connection of one of the leg members thereto, the latter being broken away, Figure 3 is a side elevational view thereof, Figure 4 is a section on line 4—4 of Figure 2, Figure 5 is a perspective detail of a ratchet member, Figure 6 is a sectional view on line 6—6 of Figure 3, and Figure 7, illustrates several detail views of a slight modification.

In the drawings as well as in the specification, the same reference characters refer to the same parts, and in which 10, indicates a tripod embracing my invention which resides in the connection between the legs 11, 12 and 13, and the table 14. The said connectiin, between the table and the various leg elements 15, 16, 17, 18, etc. consists of inverted U-shaped hangers 19 and 20, within which are inverted U-shaped ratchet members 21 and 22, the depending walls 23 and 24, of which latter members seat flush against the inner surfaces of the hangers 19 and 20. The free edges of the ratchet members are provided with ratchet teeth for a purpose which will presently be stated.

The arm 16, for instance, has fixed to each side of its upper portion 29, by bolts 30 and 31, a pair of like formed plates 32 and 33, the upper enlarged ends 34, of which extend obtusely at one side therefrom and terminate in upwardly extending segmentally arranged ratchet teeth 36 and 37. Fixedly connected to the extreme end of the arm 16 is a bolt 39, which projects through aligning slots 42 and 43, in the plates 32 and 33, and aligning oval slots 44 and 45, in the depending lobes, of member 19, whereby when the tripod is set up upon its legs, the weight of the table and its load, secured to set screw 48, will cause the table 14, to drop relative to the legs thereof, the bolt 39, raising to the top part 49, of aligning slots 44, etc., and causing the teeth to engage with the teeth 36 and 37, of members 32 and 33, thus locking the table securely relative to the legs of the tripod.

When it is desired to move the tripod, it is picked up by its table 14, which causes a reversal of the above state of action, disconnecting the sets of ratchet teeth from one another and permitting the legs of the tripod to swing to vertical position. It is, of course, obvious that the U-members 19 and 21, are secured to the table 14, by the screws 50 and 51.

It is a well known fact to photographers, surveyors, etc., that, due to insecure connections between a tripod table and its legs, one or the other often jump out of place and permit the device to fall over and often breaking valuable instruments. I am aware, of course, that some tripod legs are held partly secured by set screws or the like, but due to the time required to fasten and unfasten the same, the job is often neglected or improperly done, or as often overdone, causing mutilation of the set screws, the result of which is the same as no set screw.

Figure 5, shows several views of a modification and which consists of an inverted U-member 52, to substitute for member 19, and which is provided with struck out teeth 53 and 54, from its top wall 55, for engagement with the ratchet members 32 and 33, of the first form of the invention as above described. This eliminates the need for one member, namely ratchet member 21.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a tripod automatic means for setting and unsetting the legs to the table thereof, said means including a drop connection between said table and legs, said connection including ratchet teeth fixed to the legs of segmental form and ratchet teeth connected to the table, U-members on which the last teeth are formed, U-members connected to the table to which the legs are hung, and said latter members having oval slots in which pins fixed to the legs operate to form said drop connection.

2. In a tripod, a table, a plurality of U-shaped clamps secured thereto, rack bars associated with the web of said U-clamps, slots in the legs of said clamps, a plurality of extensions secured to the legs of the tripod and plates having segmental teeth disposed on the ends of said extensions, the teeth of said rack bars and the segmental teeth of said plate adapted to be selectively engageable, apertures in said extension and through said legs and pins received in said apertures and in said slots.

NATHAN EDWARD TEMPLE, Jr.

REFERENCES CITED

The following references are of record in the file of this patent:

UNITED STATES PATENTS

| Number | Name | Date |
| --- | --- | --- |
| 413,118 | Warner | Oct. 15, 1889 |
| 769,447 | McKinney | Sept. 6, 1904 |

FOREIGN PATENTS

| Number | Country | Date |
| --- | --- | --- |
| 295,661 | Germany | Dec. 12, 1916 |